(12) United States Patent
D'Anieri

(10) Patent No.: US 7,571,628 B2
(45) Date of Patent: Aug. 11, 2009

(54) ELECTRONIC LOCKING SYSTEM FOR VEHICLES

(76) Inventor: Marissa S. D'Anieri, 55 W. Plum St., Westerville, OH (US) 43081

( * ) Notice: Subject to any disclaimer, the term of this patent is extended or adjusted under 35 U.S.C. 154(b) by 0 days.

(21) Appl. No.: 11/767,015

(22) Filed: Jun. 22, 2007

(65) Prior Publication Data

US 2008/0046754 A1 Feb. 21, 2008

Related U.S. Application Data

(60) Provisional application No. 60/815,726, filed on Jun. 22, 2006.

(51) Int. Cl.
*E05B 71/00* (2006.01)

(52) U.S. Cl. ............... 70/234; 70/62; 70/235; 70/DIG. 41; 211/5

(58) Field of Classification Search ........... 70/233–235, 70/18, 30, 49, 58–62, DIG. 41; 211/5, 4; 248/121, 551–553; 340/5.54, 5.72, 432
See application file for complete search history.

(56) References Cited

U.S. PATENT DOCUMENTS

| | | | | |
|---|---|---|---|---|
| 458,737 | A * | 9/1891 | Massey | 119/788 |
| 3,827,773 | A * | 8/1974 | Aiello | 312/100 |
| 4,080,020 | A * | 3/1978 | Candelaria | 312/100 |
| 4,773,020 | A * | 9/1988 | Anderson et al. | 705/418 |
| 4,807,453 | A * | 2/1989 | Bernier et al. | 70/233 |
| 4,920,334 | A * | 4/1990 | DeVolpi | 340/568.4 |
| 5,270,681 | A | 12/1993 | Jack | |
| 5,278,538 | A | 1/1994 | Ainsworth et al. | |
| 5,408,212 | A * | 4/1995 | Meyers et al. | 340/427 |
| 5,598,727 | A * | 2/1997 | White | 70/233 |
| 5,917,407 | A | 6/1999 | Squire et al. | |
| 6,157,315 | A | 12/2000 | Kokubo et al. | |
| 7,233,245 | B2 * | 6/2007 | O'Neill | 340/568.2 |
| 7,337,638 | B1 * | 3/2008 | Tierney | 70/166 |
| 2006/0162407 | A1 * | 7/2006 | Kuhblank | 70/233 |

* cited by examiner

*Primary Examiner*—Lloyd A Gall
(74) *Attorney, Agent, or Firm*—Kendrick P. Patterson

(57) ABSTRACT

An electronic vehicle locking system includes a stanchion affixed to a solid surface, a housing affixed to the stanchion and one or more elongated securing members operable to wrap around a portion of a vehicle. The elongated securing members include a first locking element which is operable to engage a second locking element disposed along the length of the stanchion, thereby securing a vehicle to the stanchion. The housing includes a user input device operable to receive user input to engage or disengage the first and second locking elements, an electronic control device operable in response to the user input to send a signal to engage or disengage the first and second locking elements and a display device operable to display at least an indication of whether the first and second locking elements are engaged or disengaged.

8 Claims, 3 Drawing Sheets

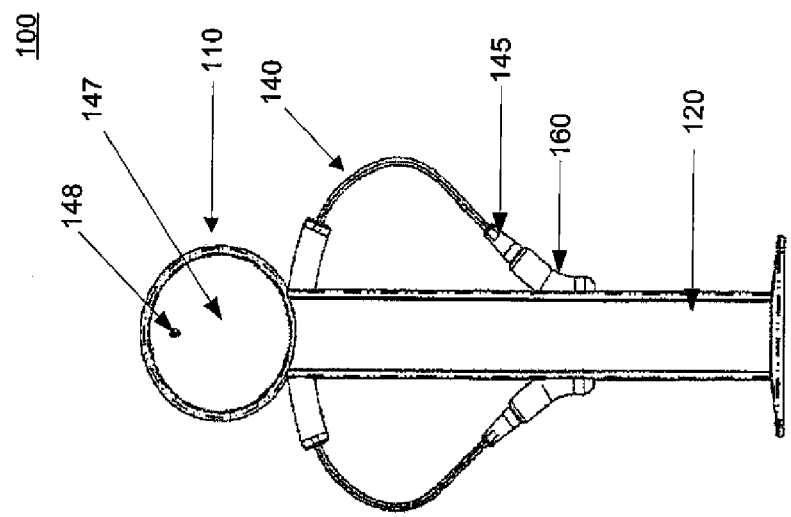
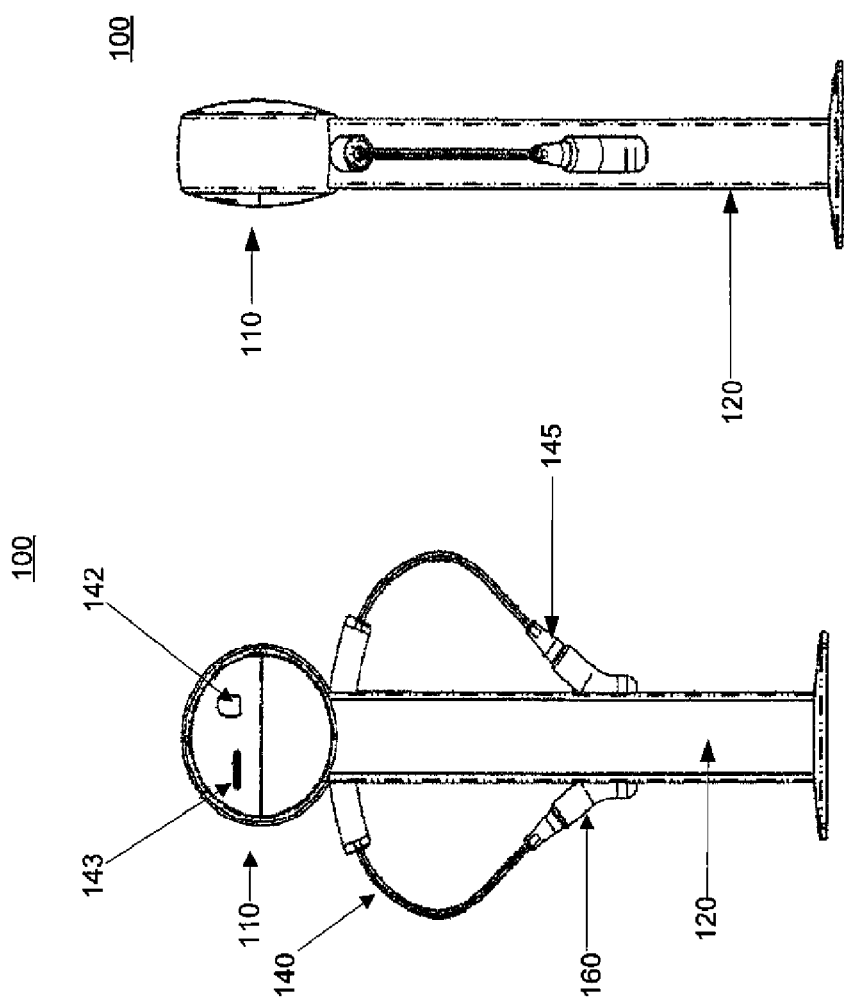

ELECTRONIC LOCKING SYSTEM FOR VEHICLES

CROSS-REFERENCE TO RELATED APPLICATIONS

The present application claims the benefit of U.S. Provisional Patent No. 60/815,726 filed Jun. 22, 2006, which is incorporated herein by reference in its entirety.

TECHNICAL FIELD

The present disclosure relates to a vehicle security system.

BACKGROUND

Cyclists generally secure their bicycles with a portable U-lock, a chain lock or cable lock which is looped through the bicycle and attached to a secure post or the like. These locks, cables and/or chains, must be either carried by a cyclist, or somehow wrapped around or placed on the frame or some other portion of the bicycle, for later removal and use when it is desired to lock the bicycle. However, because of their weight and/or size, many cyclists forget to or refuse to take such locks, cables and/or chains with them and, therefore, risk the loss of their bicycles. This loss could be prevented if an easy to use and readily available fixed vehicle locking device was available in public areas.

OVERVIEW

Disclosed is a vehicle security system, examples of which include embodiments of an electronic locking system for bicycles, motorcycles, mopeds, scooters, skateboards, carriages and other types of vehicles. In one embodiment, the electronic locking system comprises a stanchion affixed to the ground or another solid surface and a housing affixed to the stanchion. The stanchion includes an elongated securing member attached at one end thereof to the stanchion and having a first locking element at the other end thereof. The elongated securing member may be configured to be extended and retracted into the stanchion. The elongated securing member may be further configured to be wrapped or looped around a frame, a wheel or other member of a vehicle. The stanchion further includes a second locking element spaced apart from the securing member and configured to engage the first locking element of the securing member wrapped around the vehicle, thereby securing a vehicle to the stanchion.

The electronic locking system may include a housing. In one embodiment, the housing of the locking system may include a user input device operable to receive user input to engage or disengage the first and second locking elements. The housing further includes an electronic control device configured to, responsive to the user input, send a signal to engage or disengage the first and second locking elements. The housing may also include a display device configured to display at least an indication of whether the first and second locking elements are engaged or disengaged. In one embodiment, the locking system may also include a tamper detection element for detecting tampering or severance of the elongated securing member.

In one embodiment, the user input device may include a magnetic card reader. Alternatively or additionally, the user input device may include an alphanumeric keyboard. In another embodiment, the user input device may include a coin and/or bill collectors. In yet another embodiment, the user input device may comprise a biometric sensor.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments. In the Drawings:

FIG. 1 is a front elevational view of the electronic locking device according to an embodiment;

FIG. 2 is a side elevational view of the electronic locking device according to an embodiment;

FIG. 3 is a rear elevational view of the electronic locking device according to an embodiment;

DETAILED DESCRIPTION OF EXAMPLE EMBODIMENTS

Figure 4:
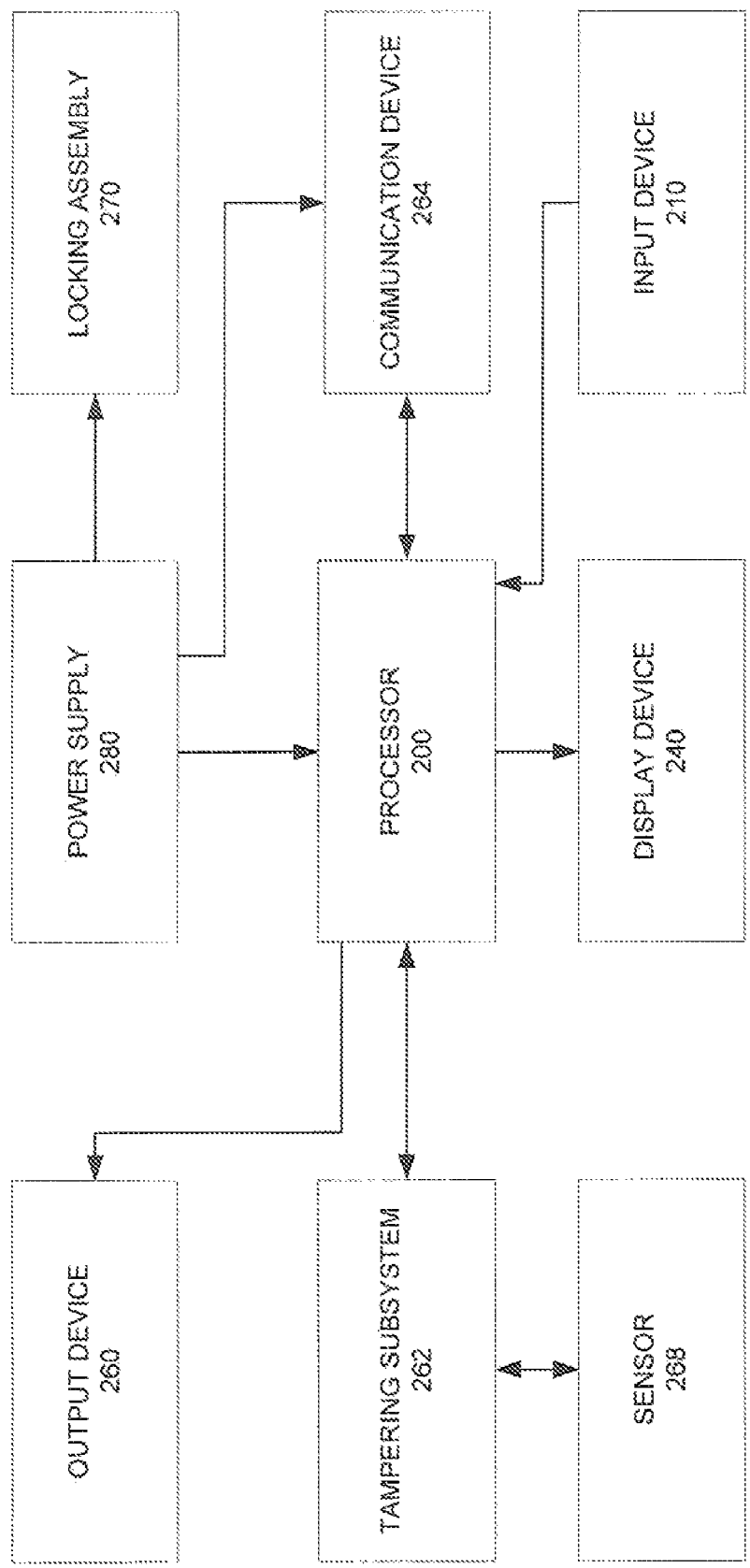
FIG. 4 is a block diagram of the components of the system and their connections to the processor according to an embodiment.

Example embodiments are embodied in an electronic vehicle locking device for supporting and securing the frame or wheel of a vehicle, such as a bicycle, a motorcycle, a moped, a scooter, a skateboard, a carriage or other types of vehicles. It is contemplated that the electronic vehicle locking system described herein may be installed in shopping centers, bus stations, school campuses, and other public areas. The electronic vehicle locking system may be located individually or combined together for locking a plurality of vehicles in a single location.

FIGS. 1-3 respectively show front, side and rear elevational views of an embodiment of the vehicle locking system 100. As depicted, the electronic vehicle locking system 100 comprises a housing 110 and a vertical stanchion 120 having one or more elongated securing members 140 that are permanently secured thereto. The housing 110 is preferably formed from a rugged, durable material, such as a hard plastic, metal or metal alloy. The housing 110 may be permanently attached to the stanchion 120, such as by welding or being machined as one component. Alternatively, the housing 110 may be removably attached to the stanchion 120 by the use of one or more bolts, screws, or other known fastening means. In an embodiment, the housing 110 may be equipped with a locking access panel to permit access to the mechanical and electrical components contained therein, which will be described in a greater detail below. FIG. 3 shows an embodiment of the vehicle locking system 100 in which the housing 110 includes a pivoting or tilting rear access panel 147 and lock 148.

In FIGS. 1-3, the elongated securing members 140 are shown inserted into locking assemblies 270 located inside of the receptacles 160. The elongated securing member 140 may include a flexible chain or cable made from hardened steel or other similar materials. The first end 145 of securing member 140 carries a first locking element, such as a plug-in locking pin (not shown) adapted to lock behind a second locking element, such as a latch (not shown) within the receptacle 160 when the locking pin is introduced therein. The first and second locking elements may be engaged or disengaged in response to the user input, such as operation of the payment card, identification card or other user input means. The second end of the securing member 140 is permanently secured to the stanchion 120 at spaced locations along the length of the stanchion 120. The securing member 140 may have a suitable length which may vary somewhat but generally is sufficiently long to enable it to be looped around a conventional bicycle frame or wheel during use. In one embodiment, the elongated securing member 140 may be covered with a non-rusting material, such as plastic or rubber for ease in sliding and for protection against the elements. The cover may be clear or colored and is applied to the cable in any known manner as by dipping or by fitting a flexible sleeve over the securing member 140 as desired. It will be understood that the arrangement and number of securing members 140 may vary. It will also be understood that different locking mechanisms may be used in alternative embodiments.

In one embodiment, the vehicle locking system 100 may include a retracting mechanism, which may be configured to enable the elongated securing members 140 to be extended from and retracted into the stanchion 120 as desired by the user. Preferably, the stanchion 120 comprises a reel (not shown) having a spring means operable to bias the reel to rotate in one direction causing the securing member 140 to wrap onto the reel. The securing member 140 may be withdrawn from the reel assembly by manually pulling it in a direction away from the stanchion 120 and retracted onto the reel by releasing it. In another embodiment, a button may be provided such that, when pushed, it allows securing member 140 to be extended. When the button is released, the securing member 140 may be locked in that it cannot be extended anymore. When the button is pushed again, securing member 140 may be retracted onto the reel. A person skilled in the art will appreciate other methods of using devices to extend and retract the securing member 140.

Referring now to FIG. 4, shown is a block diagram of the electrical and mechanical components of the vehicle locking system in accordance with one embodiment. The system 100 may include a controller device, such as a microprocessor 200, a user input device 210, a display device 240, an output device 260, a tamper detection device 262 and one or more tamper detection sensors 268, a communication device 264, a power supply 280, and a locking assembly 270, which includes a first and second locking elements, 145, 160, operable to engage or disengage each other. It is understood by those skilled in the art that the vehicle locking system may include different components in alternative embodiments.

In one embodiment, a control device, such as a microprocessor 200, may be configured to control various components of the vehicle locking system 100. For example, the processor 200 is operable to receiver and process user input data from the user input device 210. It is also operable to activate and deactivate locking assembly 270 in response to the user input. The processor 200 may also perform user authentication based on the provided user input data. It may process signals from the tamper detection device and activate and deactivate system alarm in response to the received signals. The processor 200 may also send system status data, such as system locked, unlocked or deactivated, to the display device 240, output device 260 or communication device 264. The processor 200 is also operable for processing and storing user input data and system status data into system memory (not shown).

The vehicle locking system 100 may further include a power supply 280, which provides electrical power to the processor 200 and other components of the system 100. In one embodiment, the power supply 280 may include a rechargeable battery located within the housing 110. In other embodiments, the system 100 may be powered by an AC power source, solar energy, an electrical generator, or by a combination thereof. Other power supply methods known to the skilled in the art may be used in alternative embodiments.

In an embodiment, the processor 200 is configured to communicate with one or more display devices 240, which may be used to display various types of information. Such information may include, but is not limited to, data pertaining to the duration of use of the locking system; the payment charged for use thereof; and the status of the locking system, such as locked, unlocked or deactivated. In addition, the display device 240 may display various advertisements and other promotional materials unrelated to the operation of the system 100. In various embodiment, the display device 240 may include a cathode ray tube (CRT) monitor, liquid crystal display (LCD) screen, or light emitting diode (LED) display.

In an embodiment, the processor 200 is also configured to communicate with an input device 210 capable of accepting data from a user (e.g., user data). In one embodiment, the input device 210 is equipped with an alphanumeric keypad that allows the user to manually enter information (e.g., name, card number, expiration date, and the like) displayed on a payment card (e.g., credit card, debit card) or identification card (e.g., student identification cards, employment identification cards). In another embodiment, the input device 210 is equipped with a magnetic stripe reader that can be used for swiping a payment card or identification card in a known manner. Accordingly, a slot 143 for card input may be formed in the housing as shown in FIG. 1. In yet another embodiment, the input device 210 is equipped with a portable RFID (Radio Frequency Identification) reader that is configured to read RFID-enabled cards.

In an embodiment, the input device 210 may be coupled to a communications device 264 (e.g., modem) enabled to transmit data from a payment card over a communications network (e.g., the Internet, local area network, and the like) to verify the card before accepting payment. The input device 210 quickly collects the information from the payment and passes it to card processing software at a remote location, and the results are returned and routed to the processor 200 with either an approval code or reason for objection. The use and operation of the modem and input device is known in the art, and will be appreciated that payment may be accepted in any combination of the above devices. In this embodiment, the processor 200 includes a timer means for tracking time in connection with the user's operation of the system 100 and is further operable for calculating a charge based on the measured time of operation.

In an embodiment, the processor 200 may also communicate with one or more output devices 260 operable to output various information in a human readable or other forms. Such information may include, but is not limited to, data pertaining to the duration of use of the locking system, the payment charged for use thereof, and the status of the locking system, such as locked, unlocked or deactivated. The output devices 260 may include, but are not limited to, an audio speaker (e.g., for outputting information, in addition to or in lieu of such information being output via a display device 240), an infrared transmitter, a radio transmitter, or a printer. Other output devices known to the skilled in the art may be used in alternative embodiments.

As explained above, the locking assembly 270 could be adapted to operate by means of a student identification card or employee identification card instead of a payment card. In accordance with this embodiment, the communications device 264 is utilized to permit the exchange of data or information between the processor 200 and an external computer (e.g., user account stored in database maintained by a school or an employer) in a known manner to verify a user's identification card. The input information is compared to the information stored in the external computer and upon verification of a match of the information, the processor 200 activates the locking assembly 270, which is described in greater detail hereinabove.

Other input devices 210 are capable of receiving data (e.g., user data) from a user are likewise contemplated. These include mechanisms (e.g., receivers) that can communicate through wired and/or wireless technology such as radio frequency or infrared data transfer. Additionally, mechanisms 142 (e.g., scanners) that are capable of recognizing a user's genetic characteristics such as a fingerprint, DNA, or biometric imprint may likewise be implemented as shown in FIG. 1.

The processor 200 is also operable to communicate with a tamper detection device 262. The tamper detection device 262 may include one or more tamper detection sensors 268 and control circuitry that monitors the status of each securing member 140 to detect severance of the member 140 at any point along its length or detachment of the securing member 140 from the locking assembly 270. Should the sensor 268 indicate that an unwanted intrusion has occurred, the subsystem 262 activates a visual or an audible alarm.

The operation of an electronic vehicle locking system such as the above explained locking system 100 is explained below. When a user wishes to secure a bicycle, the bicycle may be positioned in an upright position adjacent to the locking system 100. The user then controls the opening and/or locking of the locking assembly 270 by inputting user information into the input device 210. For example, if the system 100 is operable by means of payment card information, the user inputs the payment card information into the input device 210 by swiping the payment card or manually typing in the information displayed on the card. The processor 200 transmits the user input data via a communication device 264 to an external computer to verify the user input data. Once the data has been verified, the processor 200 activates the locking assembly 270. Then, the securing member 140 may be withdrawn from the reel inside the housing 110, wrapped about a bicycle frame or wheel and the end inserted into a locking assembly 270 inside the receptacle 160 of the locking system 100. Once the locking pin has been inserted into the receptacle 160, the latch element engages the locking pin to secure it in a locked position. The bicycle is then securely locked to the stanchion 120 and the user may leave the bicycle without fear of its unauthorized removal.

To remove the securing member 140 from the receptacle 160, the user may reinsert the card into the magnetic card reader. Then, the processor 200 verifies the card by matching the payment card data with data stored in the system memory and calculates a charge based on the measured time of operation. At this time, payment card transaction data is transmitted via the communication device 264 to an external computer. The display screen (not shown) may display a prompt asking the user if a receipt of the transaction is desired. The user may input a response using the input device 210 disposed on the exterior of the housing. If the user chooses to obtain a receipt, the processor 200 will instruct an output device 260, such a printer, to print such a receipt.

Figure 5:
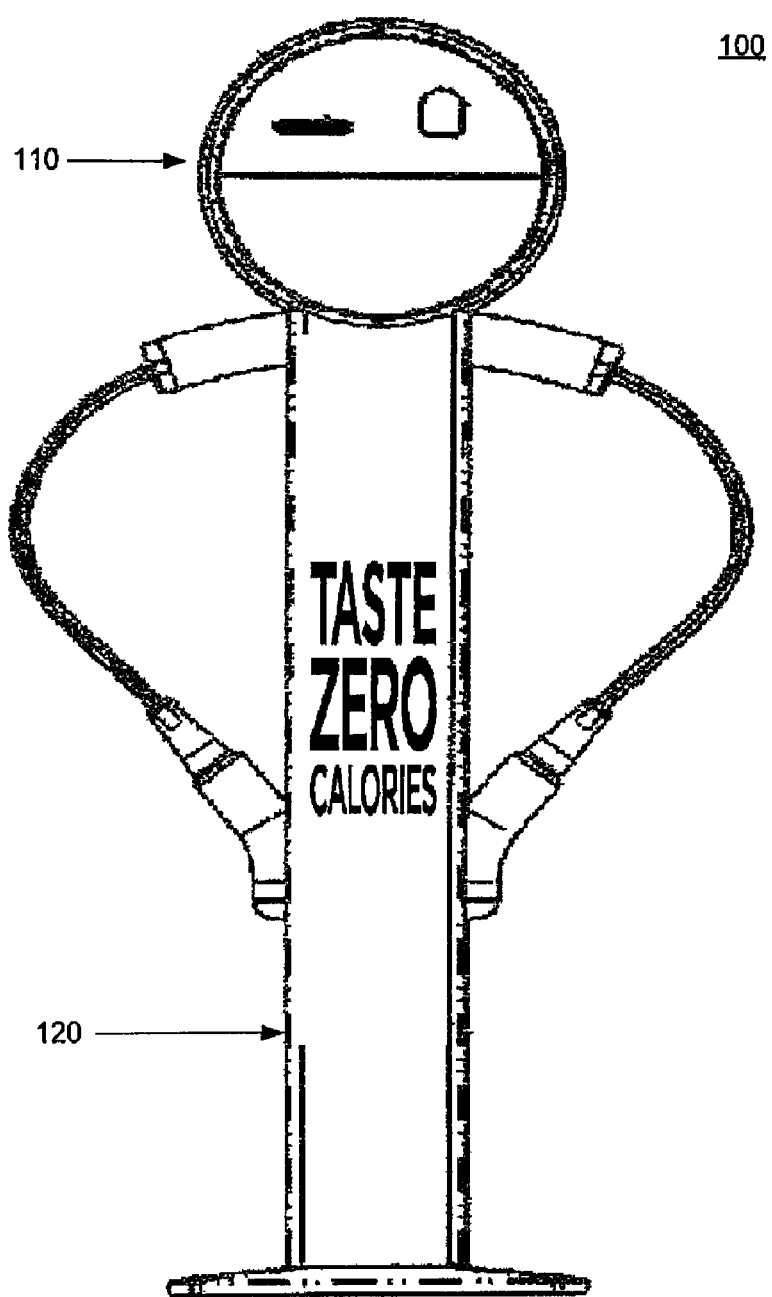
FIG. 5 is a front elevational view of the electronic locking device displaying a promotional message according to an embodiment.

Referring now to FIG. 5, the electronic vehicle locking system 100 is shown displaying an advertisement or promotional message. The stanchion 120 may include a slot and/or a compartment having an opening in which various printed materials (slogans, sayings, advertisements, and the like) may be easily inserted and/or removed as desired. Alternatively, the advertisement or promotional message may be affixed to one or more removable panels which may be fastened to the sides of the stanchion 120 using bolts, screws or other known fastening devices. The locking system 100 may include a lighting system to enhance the visibility of the advertisement or promotional message at night. For example, one or more blinking or fixed lights may be positioned behind a non-opaque backing of an advertisement message to provide illumination. Alternatively, one or more blinking or fixed lights may be positioned within or about the system 100 such that the lights themselves serve to draw attention to the advertisement message. The illumination source for the lighting system may include fluorescent sources, phosphorescence sources, lasers, electro-luminescent sources, light emitting diodes illumination sources or the like.

It will be understood that various modifications may be made to the embodiments disclosed herein. For example, it should be understood that the stanchion, housing and flexible members may have alternate shapes and dimensions so that the embodiments and variants thereof described herein may be used to secure motorcycles, scooters, skateboards, strollers and the like. Therefore, the above description should not be construed as limiting, but merely as exemplifications of embodiments. Those skilled in the art will envision other modifications within the scope, spirit and intent of the invention.

What is claimed:

1. An electronic vehicle locking system, comprising:
   a vertical stanchion affixed to a solid surface at a lower end of the stanchion, wherein the stanchion includes
   (i) at least two elongated securing members, wherein a first securing member is attached at a first side of the stanchion and a second securing member is attached at a second side of the stanchion, wherein each of the elongated securing members are attached at one end thereof to the stanchion and having a first locking element at the other end thereof, and wherein each of the securing members are configured to be wrapped around a portion of a vehicle, and
   (ii) a plurality of second stanchion locking elements, each stanchion locking element configured to engage a respective first locking element of the at least two securing members wrapped around a portion of the vehicle, thereby securing a vehicle to the stanchion; and
   a housing affixed to the stanchion at an upper end of the stanchion, wherein the housing includes
   (i) a user input device configured to receive user input to engage or disengage the first and second locking elements;
   (ii) an electronic control device configured to, responsive the user input, authenticate a user as having authority to disengage the first and second locking elements, and thereby send a signal to engage or disengage the first and second locking elements based on a user authentication; and
   (iii) a display device configured to display at least an indication of whether the first and second locking elements are engaged or disengaged.

2. The system of claim 1, wherein the vehicle comprises one or more of a bicycle, a motorcycle, a scooter, a skateboard, or a carriage.

3. The system of claim 1, wherein the elongated securing members are operable to be extended from and retracted into the stanchion.

4. The system of claim 1, comprising a tamper detection element for detecting tampering or severance of the elongated securing members.

5. The system of claim 1, wherein the user input device comprises a magnetic card reader.

6. The system of claim 1, wherein the user input device comprises a biometric sensor or an alphanumeric keyboard.

7. The system of claim 1, wherein the control device comprises a microprocessor.

8. The system of claim 7, wherein the microprocessor is operable to verify user input data.

* * * * *